United States Patent
Araki et al.

(10) Patent No.: US 10,407,137 B2
(45) Date of Patent: Sep. 10, 2019

(54) CONTAINER SHIP AND CONTAINER HANDLING METHOD

(71) Applicant: SHIBAKAI CO., LTD., Tokyo (JP)

(72) Inventors: Manabu Araki, Tokyo (JP); Toru Araki, Tokyo (JP)

(73) Assignee: SHIBAKAI CO., LTD., Tokyo (JP)

( * ) Notice: Subject to any disclaimer, the term of this patent is extended or adjusted under 35 U.S.C. 154(b) by 70 days.

(21) Appl. No.: 15/555,426

(22) PCT Filed: Sep. 12, 2016

(86) PCT No.: PCT/JP2016/004145
§ 371 (c)(1),
(2) Date: Sep. 1, 2017

(87) PCT Pub. No.: WO2018/047215
PCT Pub. Date: Mar. 15, 2018

(65) Prior Publication Data
US 2018/0354588 A1    Dec. 13, 2018

(51) Int. Cl.
| | | |
|---|---|---|
| *B63G 8/00* | (2006.01) | |
| *B63B 27/00* | (2006.01) | |
| *B63B 1/04* | (2006.01) | |
| *B63B 25/00* | (2006.01) | |
| *B63B 27/14* | (2006.01) | |

(Continued)

(52) U.S. Cl.
CPC .............. *B63B 27/00* (2013.01); *B63B 1/042* (2013.01); *B63B 13/02* (2013.01); *B63B 25/004* (2013.01); *B63B 25/008* (2013.01); *B63B 27/143* (2013.01); *B63B 35/003* (2013.01); *B63B 43/06* (2013.01); *B62B 3/10* (2013.01);

(Continued)

(58) Field of Classification Search
CPC .............. B63B 19/08; B63B 2019/083; B63B 2019/086; B63G 8/001
See application file for complete search history.

(56) References Cited

U.S. PATENT DOCUMENTS 1,296,646 A  *  3/1919  Georgelis ................ B63G 8/00
                                              440/48
3,897,743 A  *  8/1975  Schoonman ........... B63G 8/001
                                              114/321

(Continued)

FOREIGN PATENT DOCUMENTS

| AU | 1849083 A | 3/1984 |
| EP | 1273511   | 1/2003 |

(Continued)

OTHER PUBLICATIONS

International Search Report and Written Opinion for corresponding International Application No. PCT/JP2016/004145, dated Nov. 29, 2016 (with English Translation).

*Primary Examiner* — Andrew Polay
(74) *Attorney, Agent, or Firm* — Renner, Otto, Boisselle & Sklar, LLP

(57) ABSTRACT

To be able to improve the flexibility in handling containers, a container ship configured to transport containers includes: an opening 106 through which cargo may be handled by moving a wheeled platform 501 between the container ship and a dock, the wheeled platform 501 including a plurality of containers 401 placed thereon; and a floor board 108 or a rail configured to support the wheeled platform 501 loaded from the dock through the opening 106.

4 Claims, 5 Drawing Sheets

(51) Int. Cl.
  *B63B 43/06* (2006.01)
  *B63B 35/00* (2006.01)
  *B63B 13/02* (2006.01)
  *B63B 43/04* (2006.01)
  *B62B 3/10* (2006.01)
  *B62B 5/00* (2006.01)

(52) U.S. Cl.
  CPC ....... *B62B 5/0026* (2013.01); *B63B 2001/045* (2013.01); *B63B 2043/047* (2013.01); *B63B 2207/02* (2013.01)

(56) References Cited

U.S. PATENT DOCUMENTS

| | | | |
|---|---|---|---|
| 4,803,940 | A * | 2/1989 | Ebeling .................. B63B 19/08 114/72 |
| 7,267,072 | B2 * | 9/2007 | Zhang .................... B63G 8/001 114/312 |
| 2013/0180442 | A1 * | 7/2013 | Pedersen ................ B60L 11/18 114/72 |
| 2018/0037406 | A1 | 2/2018 | Araki et al. |

FOREIGN PATENT DOCUMENTS

| | | |
|---|---|---|
| JP | H03-159897 | 7/1991 |
| JP | H10-250985 | 9/1998 |
| JP | 2000-168960 | 6/2000 |
| JP | 2012-86949 | 5/2012 |
| WO | 2016139698 | 9/2016 |

\* cited by examiner

CONTAINER SHIP AND CONTAINER HANDLING METHOD

TECHNICAL FIELD

The present invention relates to a container ship that transports containers, and a container handling method.

BACKGROUND ART

Containers transported by a container ship are handled by a container crane mounted in a container yard (see, for example, Patent Documents 1 and 2).

CITATION LIST

Patent Documents

PATENT DOCUMENT 1: Japanese Unexamined Patent Publication No. H10-250985
PATENT DOCUMENT 2: Japanese Unexamined Patent Publication No. 2012-86949

SUMMARY OF THE INVENTION

Technical Problem

Containers are handled by a container crane as described above so as to be transferred to a container ship. This prevents containers from being handled on a portion of a dock outside a container yard.

In view of the foregoing background, it is therefore an object of the present invention to be able to improve the flexibility in handling containers.

Solution to the Problem

The present invention provides a container ship configured to transport containers. The container ship includes: an opening which is formed through a side of the container ship, and through which cargo may be handled by moving a wheeled platform between the container ship and a dock, the wheeled platform including a plurality of containers placed thereon; and a floor board or a rail configured to support the wheeled platform loaded from the dock through the opening.

This allows the containers to be handled by moving the wheeled platform through the opening of the ship. Thus, the containers may be handled even on a dock where no gantry crane, for example, is mounted.

Advantages of the Invention

The present invention may improve the flexibility in handling containers.

DESCRIPTION OF EMBODIMENTS

Embodiments of the present invention will now be described in detail with reference to the drawings.

(Container Ship)

Figure 1:
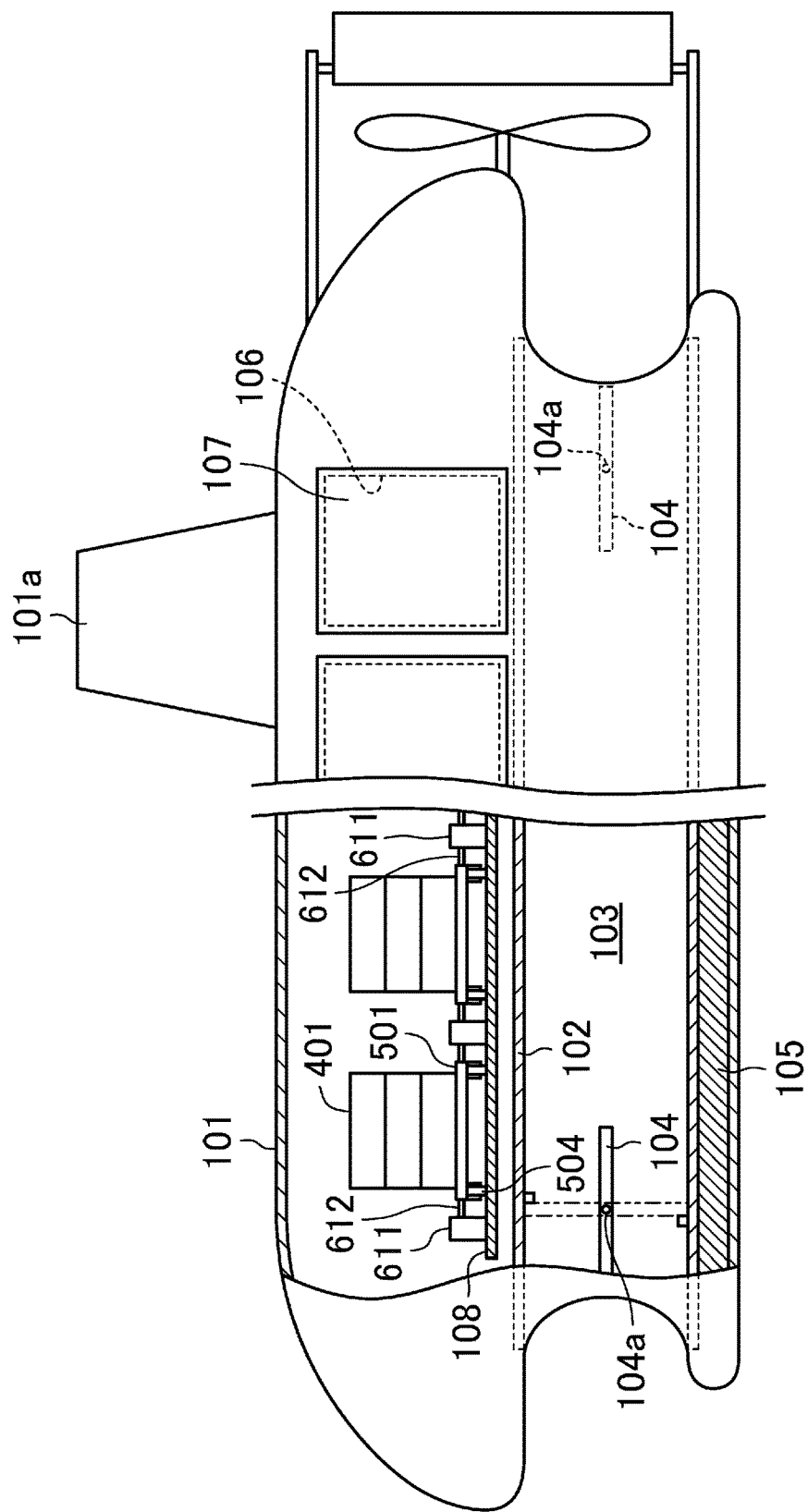
FIG. 1 A partial cross-sectional side view showing a configuration for an essential portion of a container ship.
Figure 2:
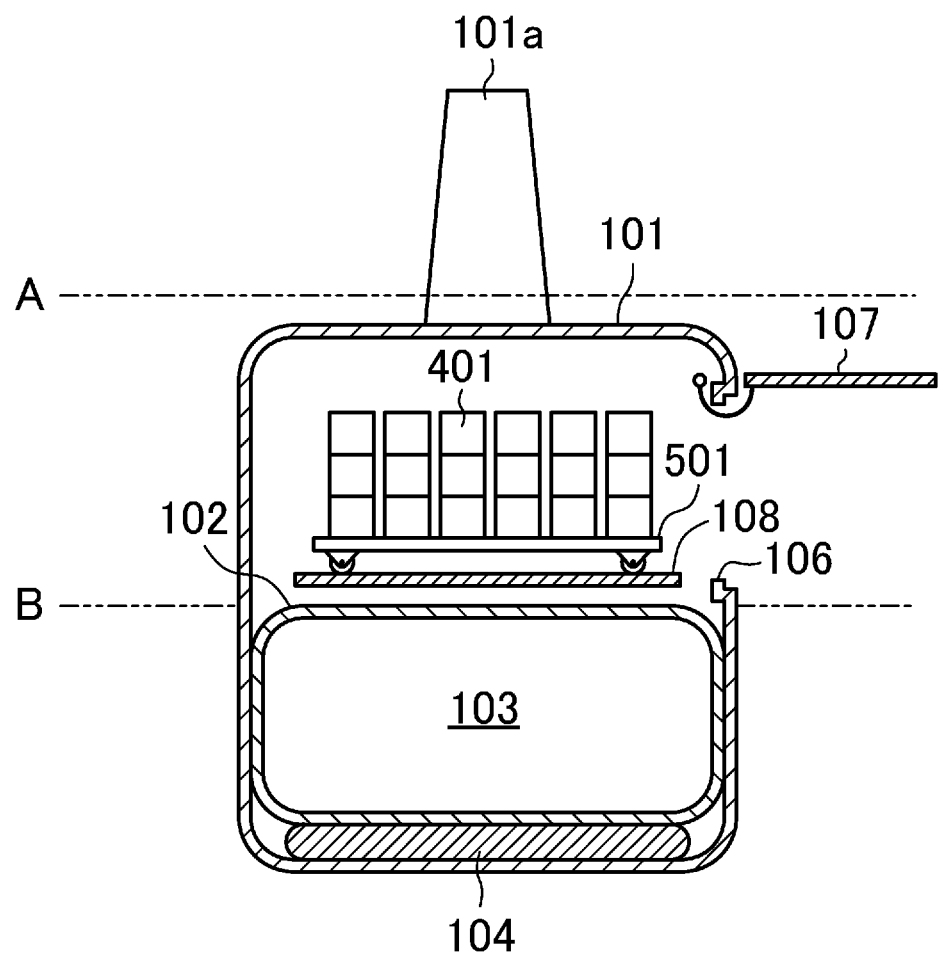
FIG. 2 A partial cross-sectional front view showing a configuration for an essential portion of the container ship.

First, a container ship that transports containers will be described. As shown in FIGS. 1 and 2, the container ship has a hull 101 having a lower portion provided with a channel 103 which is defined by a channel partition 102 and through which water from the outside of the ship can flow from its bow to its stern. Portions of the channel 103 near the bow and stern are each provided with a channel closing door 104 turnable on a rotary shaft 104a. A ballast 105 containing lead, for example, is provided under the channel 103. Thus, while the channel closing doors 104 are opened so that the channel 103 is open, a portion of the hull 101 except a bridge 101a, for example, is underwater, i.e., sinks below the waterline indicated by the character A in FIG. 2. In other words, the hull 101 sinks to the extent that it is not substantially affected, or less affected, by waves. On the other hand, if the channel closing doors 104 close so that the channel 103 is closed, and water inside the channel 103 is discharged, the hull 101 may rise such that the waterline corresponds to the line indicated by the character B in FIG. 2. The channel 103 may include therein a propeller such as a screw propeller.

A side of the hull 101 has openings 106. The openings 106 each closed by a door 107 allow watertightness to be maintained while the hull 101 is underwater. When the hull 101 rises, the lower end of each opening 106 is located above the waterline indicated by the character B so that containers 401 placed on a wheeled platform 501 may move (be loaded and/or landed) between the hull 101 and a dock through the opening 106.

The hull 101 includes therein a floor board 108, on which the containers 401 placed on the wheeled platform 501 are loaded. Wheeled platform drivers 611 are provided on the floor board 108 to drive the movement of the wheeled platform 501 between the floor board 108 and the dock. How to drive the movement should not be specifically limited. However, a connection arm 612 attached to a chain driven by a motor, for example, may be connected to the wheeled platform 501 to drive the movement.

To adjust the waterline in an auxiliary manner, a separate ballast tank capable of adjusting the water amount may be used in combination.

(Wheeled Platform 501)

Figure 3:
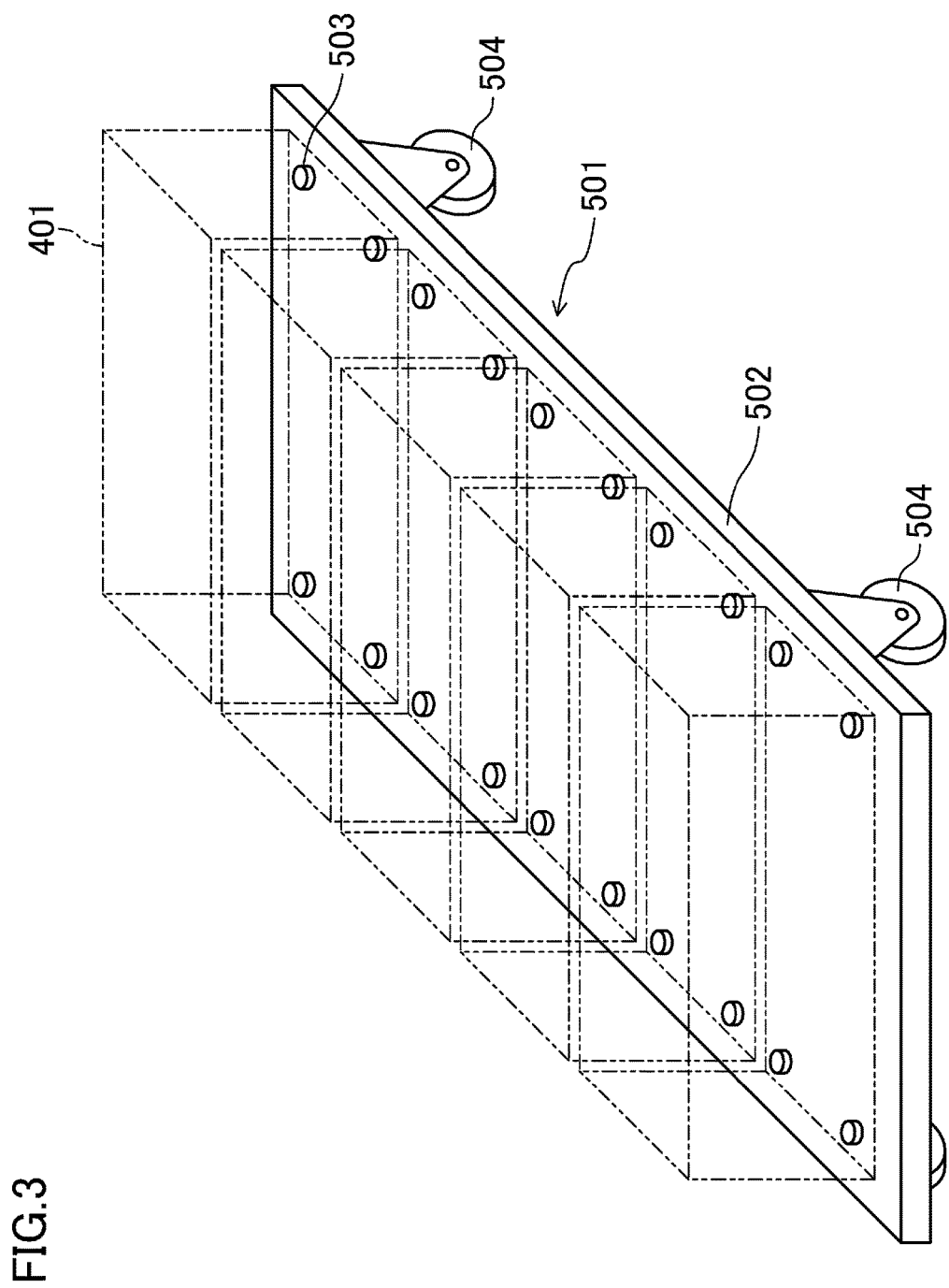
FIG. 3 A perspective view showing a configuration for a wheeled platform for containers.

The wheeled platform 501 includes a pedestal 502 on which the multiple containers 401 described above may be placed in multiple layers, as shown in FIG. 3 (which shows a state where the containers 401 are placed in only one layer for convenience). The pedestal 502 has an upper surface having engaging portions 503 similar to those used to fix a container in a ship or a trailer and in conformity with ISO standards, for example. A further member for lashing down a container, for example, may be provided.

An appropriate number of wheels 504 are attached to a lower portion of the pedestal 502. The wheels 504 may have a fixed orientation, or may be partially or totally steerable (turnable on a vertical axis by 90° or more, 180° or more, or 360°, for example). A drive motor may be provided to drive some or all of the wheels such as the steerable wheels so that the wheeled platform 501 is self-propellable.

Using the wheeled platform 501 described above allows the multiple containers 401 to be handled together without using a container crane. This may make it easy for the containers to be transported in a dispersed manner by trailer trucks using a dock where no container crane is mounted, for example. This may easily reduce traffic of trailer trucks in a container yard, and may easily increase the availability of a container crane or a dock.

The floor board 108 may be further provided with a rail or a guide to guide the wheels 504 of the wheeled platform 501. Alternatively, instead of the floor board 108, such a rail or such a guide may be provided. A manual or automatic fixing mechanism or stopper, for example, may be provided to fix the loaded wheeled platform 501.

A foldable crossing plank extending across a gap between the floor board 108 and the dock, for example, may be provided broadside.

Floor boards, rails, or other members may be provided in multiple layers so that wheeled platforms 501 can be loaded in multiple layers in a vertical direction. In that case, the floor boards or other members may be designed to be movable upward and downward, just like a multistory parking space. Alternatively or additionally, shifting the waterline upward or downward by injecting or discharging water into or from the channel 103 or the ballast tank as described above may allow the height of a target floor board, for example, to be adjusted to the height of the dock. In the latter case, upper and lower doors separately openable and closable independently from each other in the vertical direction are provided instead of the door 107. The upper and lower doors are arranged so that their heights correspond to the heights of the associated floor boards, for example. The lower door may close, and the upper door may open, depending on how much the hull sinks. The containers 401 may be able to be loaded, and landed, through the opened door.

(Container 401)

Figure 4:
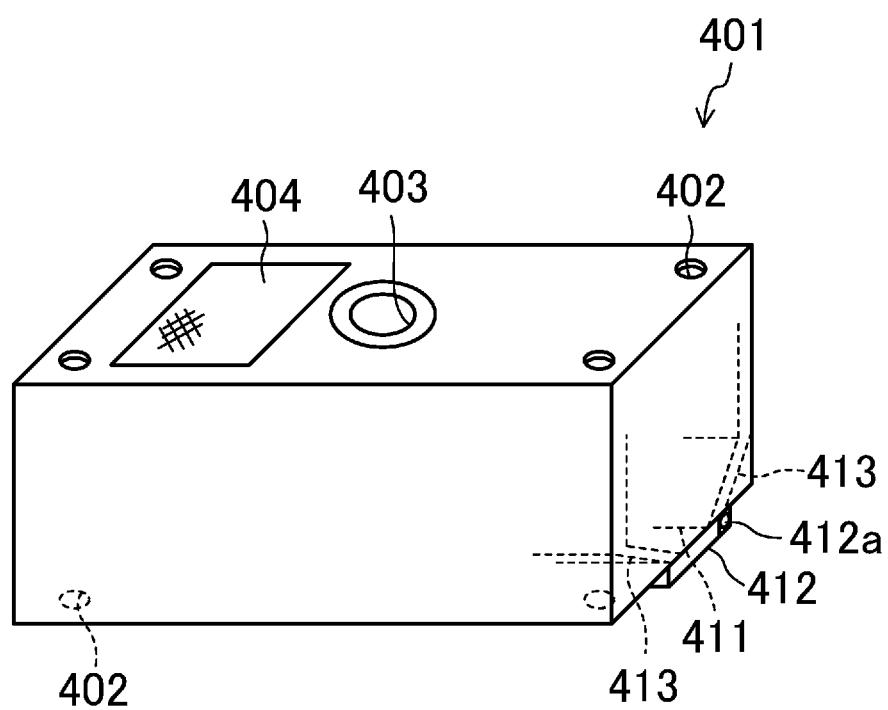
FIG. 4 A perspective view showing a configuration for a container.

A typical freight container may be used as each container 401. However, charging bulk cargo into a container 401 such as the one shown in FIG. 4 may make it easy to handle and transport such bulk cargo just like a typical freight container.

The outer shell of the container 401 has upper and lower surfaces each provided with engageable portions 402 respectively engaged with connectors, referred to as, for example, twist locks, at four corners of the surface. The engageable portions 402 each have a size and a shape in conformity with ISO standards or other standards, for example. The top of the container 401 has an opening 403 through which bulk cargo flows into the container 401. The opening 403 is beneficially connectable to a discharge nozzle of a transporting device similar to a pneumatic unloader by flange coupling or any other coupling process with the container 401 kept hermetic. However, a simple opening merely needs to be formed on the entirety or part of the top, depending on types and other characteristics of the bulk cargo.

The top of the container 401 is provided with a filter 404, through which air in the container 401 is exhausted when bulk cargo is charged into the container 401, and which may reduce the amount of dust and other substances flowing out.

The bottom of the container 401 has an outlet 411 which is an opening of the bottom wall of the container 401 and through which bulk cargo is discharged. The outlet 411 may be opened and closed by an outlet lid 412 that is turnable on a rotary shaft 412a. The container 401 includes therein an inclined plate 413 extending from the periphery of the outlet 411 to a side wall of the container 401. This allows the bulk cargo in the container to be easily discharged with reliability.

Using the container 401 described above may make it easy to handle such bulk cargo just like a typical freight container even in a container yard which is devoid of a grab bucket for handling bulk cargo, a cargo handling system such as a pneumatic unloader, a storage facility such as a silo, and any other suitable device. This may improve the flexibility in landing bulk cargo and facilitate effective use of the dock.

A baffle board may be provided near the inner surface of the filter 404 in the container 401 to make it less likely for bulk cargo to come into direct contact with the filter 404. This may more easily reduce the amount of dust and other substances flowing out.

The filter 404 does not always need to be provided at one location, but may include a plurality of filters dispersed at multiple locations. One or more filters may be provided for the side wall, for example. In this case, a baffle board or a partition wall may be used as necessary. Further, a plurality of filters may be provided for each of side walls of the container 401 at both longitudinal ends or other portions thereof. Alternatively, one or more filters may be provided for each of an upper wall and the side walls of the container.

The outlet lid 412 does not always need to be configured as the single lid as described above, but may be divided into two or more pieces to form a set of double doors. Alternatively, the container 401 may include an outlet lid which entirely, mostly, or at least partially covers the bottom of the container 401 (the opening of the bottom wall) and may be able to fully open or substantially fully open the bottom, for example. A door may be provided in the entirety or a portion of a side wall located at one of the longitudinal ends or a side wall extending longitudinally, such that the side wall may open and close.

An integral or separate lid or hatch may be provided to close the opening 403.

The container 401 described above may include therein an air conditioning unit that can control at least one of temperature or humidity. If the container is filled with grains or any other objects, for example, the provision of such a unit makes it easy to store the grains as they are. The grains may be landed at a wharf where no silo is provided, and may be stored on the spot, or may be stored at a destination. This may, for example, significantly enhance the flexibility in using the wharf, or may reduce the burden of providing a silo or any other facility (eliminate the need to provide a silo). Furthermore, in disaster situations or other situations, the container 401 may be used not only as a transport means for bulk cargo but also as a storage means at a destination.

Using the container 401 described above may make it easy to reduce the amount of dust and other substances flowing out. However, this is merely an example of the present invention. Bulk cargo may be charged into the container 401 using a grab bucket, a hopper, or any other tool simply by making the upper wall openable and closable, for example.

(Cargo Handling and Transport)

Cargo handling on the container ship described above (in particular, cargo handling performed when bulk cargo is transported) will be described.

First, the containers 401 are each filled with bulk cargo, and then are placed on the wheeled platform 501. Alternatively, the containers 401 placed on the wheeled platform 501 in advance may be each filled with bulk cargo.

Meanwhile, the ends of the channel 103 of the container ship near the bow and stern are closed by the respective channel closing doors 104. Then, the underwater container ship of which the waterline is indicated by the character A in FIG. 2 rises by discharging water in the container ship. As a result, the lower ends of the openings 106 and the floor board 108 are located above the location indicated by the character B. In this case, the channel 103 merely needs to be closed with the channel closing doors 104, not so that high watertightness is maintained, but so that discharging water allows the container ship to have necessary buoyancy during cargo handling.

If the hull 101 rises as described above, the doors 107 open so that the associated openings 106 are open. At this timing, the wheeled platform 501 on which the containers 401 are placed is loaded into the ship through the opening 106 using the wheeled platform drivers 611 mounted on the floor board 108 or a device such as a forklift on the dock. A crossing plank extending across a gap between the floor board 108 and the dock may be provided near the openings 106. Furthermore, the doors 107 may also act as the crossing plank.

After completion of loading, each door 107 closes the associated opening 106. Passing water through the channel 103 and unclosing the channel closing doors 104 allow the container ship to be underwater. Furthermore, to propel the container ship, water flows through the channel 103.

Transporting bulk cargo charged into the container 401, which is then loaded on the container ship, as described above, may make it easy to handle bulk cargo and improve the degree of flexibility in loading a plurality of types of freight. In addition, there is no need for a facility, such as a coal yard, where bulk cargo is to be stored after landing, and overland transport may be easily performed. To obtain such advantages, a container ship from which cargo can be handled or a submersible container ship does not always need to be used, but a typical container ship may be used.

If typical containers or the containers 401 filled with bulk cargo may be handled through the openings of the ship, cargo may be handled even on a dock where no gantry crane, for example, is mounted. This may improve the flexibility in handling the containers and allow the dock to be effectively used. For example, even if the weight of a heavy object, such as coal, charged into each container 401 exceeds a maximum amount of weight that the gantry crane can lift, the container 401 may be easily handled irrespective of such weight limits.

A container ship that can navigate with its hull underwater may reduce wave-making resistance to achieve efficient transport, and also contributes to low temperature transport. In addition, the channel 103 through which water from the outside of the ship can flow during navigation allows the ship to be controlled such that the ship is underwater or rises. This may easily prevent or reduce marine pollution and other phenomena which could be caused in a situation where water is injected into and discharged from the ballast tank to adjust the waterline and which involve conveying seawater in a sea area near a port of embarkation to a sea area near a port of entry, for example.

(Another Exemplary Container Ship)

Figure 5:
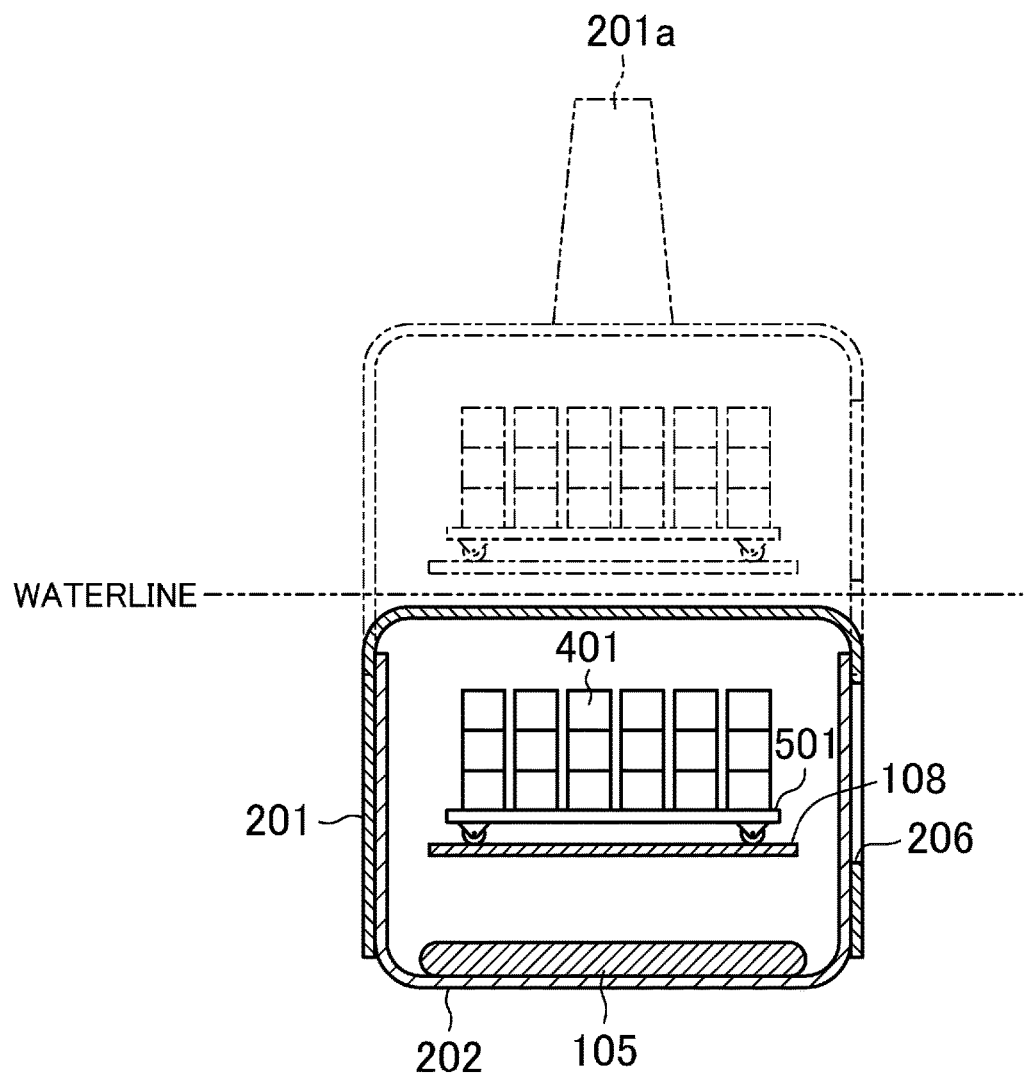
FIG. 5 A cross-sectional front view showing a configuration for an essential portion of another exemplary container ship.

To allow a container ship to be underwater or rise, the container ship may have a structure shown in FIG. 5, for example. The container ship includes an upper hull 201 and a lower hull 202 which are movable relative to each other in the vertical direction. The upper and lower hulls 201 and 202 are sealed with at least any regions of overlapping portions of their side walls so that watertightness may be maintained.

The side wall of the upper hull 201 has openings 206 through which containers 401 placed on a wheeled platform 501 may be moved between the container ship and a dock. A floor board 108 on which a wheeled platform 501 is loaded is fixed to the upper hull 201, and is designed to move vertically relative to the lower hull 202 together with the upper hull 201.

A ballast 105 is provided on the bottom of the lower hull 202. When the upper hull 201 moves downward, the container ship is located underwater such that, for example, only a bridge 201a is above water. On the other hand, when the upper hull 201 moves upward together with the floor board 108, the floor board 108 and the lower ends of the openings 206 are above the waterline, and the wheeled platform 501 on which the containers 401 are placed may be moved between the container ship and the dock.

If moving the upper and lower hulls 201 and 202 relative to each other in the vertical direction as described above allows the ship to be controlled such that the ship is underwater or rises, this control may also easily prevent or reduce marine pollution and other phenomena.

DESCRIPTION OF REFERENCE CHARACTERS

101 Hull
101a Bridge
102 Channel Partition
103 Channel
104 Channel Closing Door
104a Rotary Shaft
105 Ballast
106 Opening
107 Door
108 Floor Board
201 Upper Hull
201a Bridge
202 Lower Hull
206 Opening
401 Container
402 Engageable Portion
403 Opening
404 Filter
411 Outlet
412 Outlet Lid
412a Rotary Shaft
413 Inclined Plate
501 Wheeled Platform
502 Pedestal
503 Engaging Portion
504 Wheel
611 Wheeled Platform Driver
612 Connection Arm

The invention claimed is:

1. A container ship configured to transport containers, the container ship comprising:
    an opening which is formed through a side of the container ship, and through which cargo may be handled by moving a wheeled platform between the container ship and a dock, the wheeled platform including a plurality of containers placed thereon; and
    a floor board or a rail configured to support the wheeled platform loaded from the dock through the opening, further comprising:
    a door capable of watertightly closing the opening, wherein
    the container ship is configured to be submersible with the door closed.

2. The container ship of claim 1, further comprising:
    a channel through which a stream of water may flow while the container ship is being propelled, wherein discharging water in the channel allows the container ship to rise such that the opening of the ship is located above a waterline.

3. The container ship of claim 1, further comprising:
upper and lower hulls movable relative to each other in a vertical direction, wherein
when the upper hull moves downward relative to the lower hull, the container ship is submersible, and
when the upper hull moves upward relative to the lower hull, the opening of the ship may be located above a waterline.

4. The container ship of claim 1, further comprising:
a driver configured to drive movement of the wheeled platform toward a side of the ship.

* * * * *